US009017161B2

(12) United States Patent
Watkins

(10) Patent No.: US 9,017,161 B2

(45) Date of Patent: Apr. 28, 2015

(54) WAGERING GAME WITH AWARDED PAYLINES

(75) Inventor: Brian Watkins, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 253 days.

(21) Appl. No.: 13/604,965

(22) Filed: Sep. 6, 2012

(65) Prior Publication Data

US 2014/0066169 A1 Mar. 6, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.

CPC ............ *G07F 17/32* (2013.01); *G07F 17/3267* (2013.01); *G07F 17/34* (2013.01)

(58) Field of Classification Search

USPC ...................................................... 463/16–25

See application file for complete search history.

(56) References Cited

U.S. PATENT DOCUMENTS

| | | | | |
|---|---|---|---|---|
| 7,402,101 | B2 | 7/2008 | Casey | |
| 7,585,221 | B2 * | 9/2009 | Singer et al. | 463/20 |
| 2007/0026923 | A1 * | 2/2007 | Muir | 463/16 |

* cited by examiner

*Primary Examiner* — Adetokunbo O Torimiro

(74) *Attorney, Agent, or Firm* — Nathan H. Calvert, Esq.; Russell D. Culbertson, Esq.; J P Cody, Esq.

(57) ABSTRACT

A gaming system, apparatus, and method are disclosed with one or more additional payline awards made through special symbols appearing in the game. The number of additional paylines is determined based at least on the special symbol present. A preferred version provides a slot machine game with a payline meter zone on a dedicated display or beside the reels which emphasizes to the player the amount of additional paylines provided and their application in the prize award.

12 Claims, 9 Drawing Sheets

WAGERING GAME WITH AWARDED PAYLINES

FIELD OF THE INVENTION

This invention relates to wagering games, gaming machines, networked gaming systems and associated methods. More particularly, the invention relates to wagering games, gaming devices, networked gaming systems, and associated methods that award, in game outcomes, additional paylines for evaluation.

BACKGROUND

A large number of different gaming machines have been developed to provide various formats and graphic presentations for conducting games and presenting game results. Many past slot machine games have presented payline variations to enhance player excitement, including scatter patterns which occur without paylines, and special symbols which may award certain prizes or bonus rounds merely by their appearance.

However, seasoned players have seen many different payline variations and become familiar with scatter pays and special symbols. There continues to be a need to generate more player interest and excitement by providing new aspects to games.

SUMMARY OF THE INVENTION

A gaming system, apparatus, and method are disclosed with one or more additional payline awards made through special symbols appearing in the game. The number of additional paylines is determined based at least on the special symbol present. A preferred version provides a slot machine game with a payline meter zone on a dedicated display or beside the reels which emphasizes to the player the amount of additional paylines provided and their application in the prize award.

Another version of the invention is a computer program stored on a non-transitory readable medium. The software version is, of course, typically designed to be executed by a gaming machine or networked gaming system. The software includes multiple portions of computer executable code referred to as program code. Gaming results are provided in response to a wager and displayed by display program code that generates simulated slot reels each including one or more symbol locations. The program also has game controller program code for determining game play results involving spins or other randomization of an array of symbols, and providing the payline meter zone and its animations.

Another version of the invention is a gaming system that includes one or more gaming servers, and a group of electronic gaming machines connected to the servers by a network. The various functionality described herein may be distributed between the electronic gaming machines and the gaming servers in any practically functional way. For example, the current preferred architecture is for the servers to determine all aspects of game logic, random number generation, and prize awards. The gaming machines provide functionality of interfacing with the player and animating the game results to present the results received from the server in an entertaining manner. However, other embodiments of course might use a thin client architecture in which the animation is also conducted by the server and electronic gaming machines serve merely as a terminal to receive button or touchscreen input from the player and to display graphics received from the server.

These and other advantages and features of the invention will be apparent from the following description of the preferred embodiments, considered along with the accompanying drawings.

DETAILED DESCRIPTION OF PREFERRED EMBODIMENTS

Figure 1A:
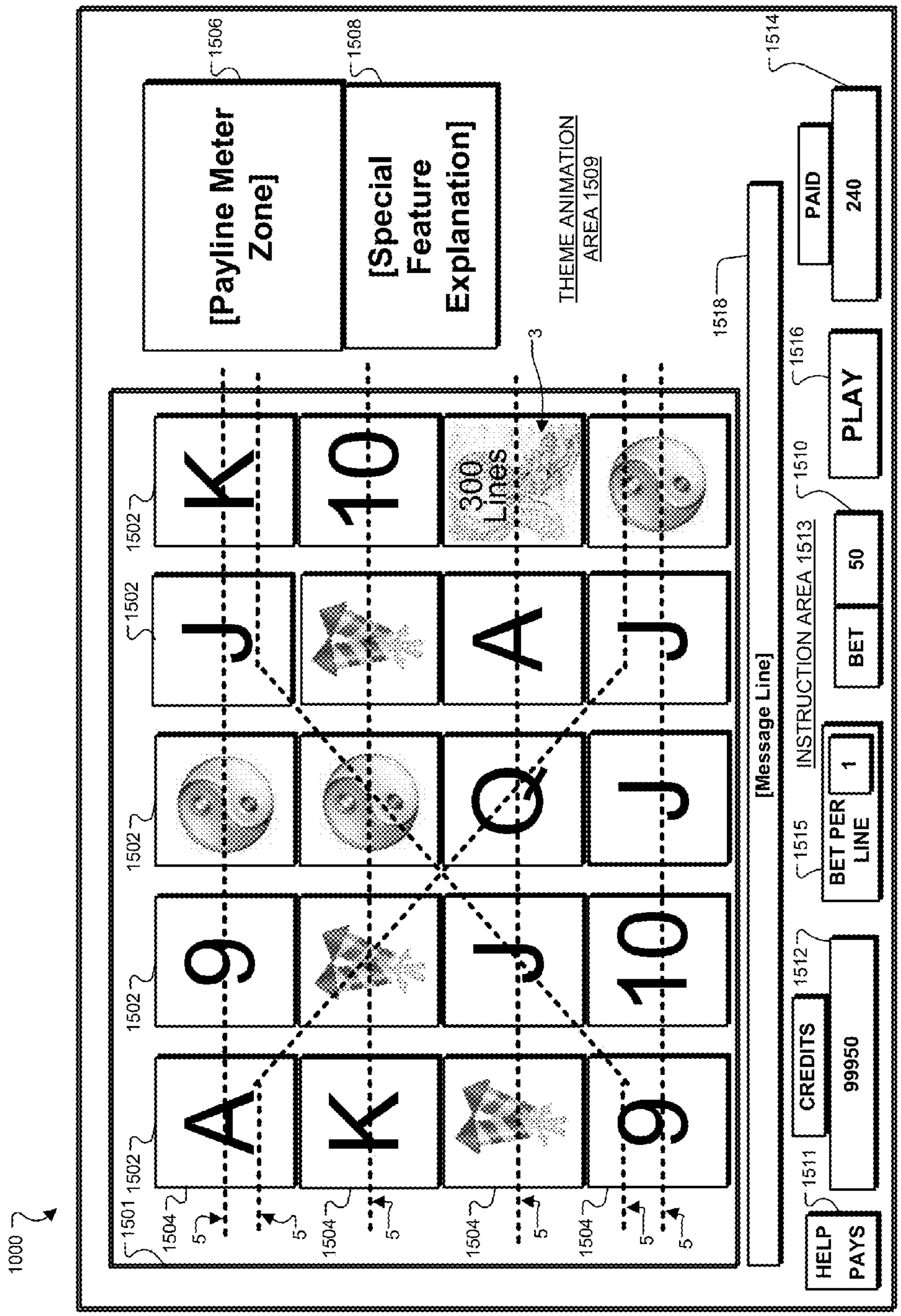
FIG. 1A is an example game screen diagram showing a game result with example original paylines identified and a special symbol according to an example embodiment.
Figure 1B:
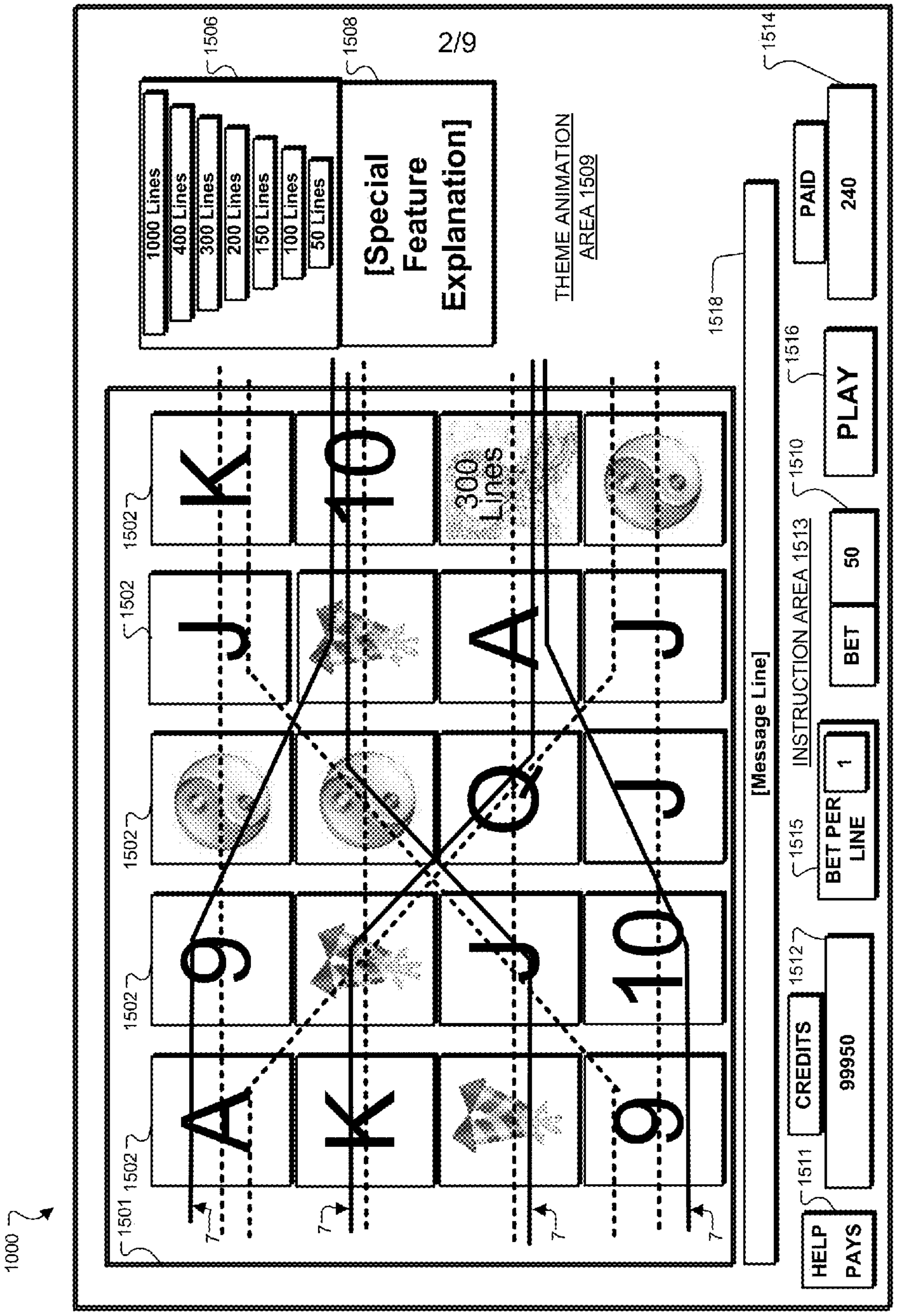
FIG. 1B shows the same screen diagram with example additional paylines identified.

FIG. 1A is an example game screen diagram 1000 showing a game result with example original paylines identified and a special symbol according to an example embodiment. FIG. 1B shows the same screen diagram with additional paylines identified. Referring to the graphical objects shown on the example game screen diagrams in FIGS. 1A-B, game screen 1000 has a gaming zone, which in this embodiment is a matrix of symbol locations 1501, in which is displayed the primary conduct of the base game. The matrix of symbol locations 1501 consists of five simulated reels 1502, and each reel has four positions or symbol locations 1504.

Next to the matrix of symbol locations 1501 is the payline meter zone 1506, in which the additional payline award is emphasized to the player in preferred embodiments. Under the payline meter zone 1506 there is a special feature explanation zone 1508, which in the preferred additional payline award game contains text or animations instructing the player as to how the additional payline awards work. Under the special feature explanation zone 1508 is a theme animation area 1509, which preferably shows animations related to the conduct or progress of the game. In the various symbol locations 1504 in matrix 1501 can be seen certain symbols included in the special symbol 3 (shown in the fifth reel 1502), which, when present, provides the additional payline award as will be further described below. The diagram also shows several original paylines 5 defining combinations of symbol locations that are used to match symbols and award prizes. Original paylines 5 are shown as dotted lines, and are typically not depicted on the game screen during play, but may be highlighted during the prize presentation phase in some embodiments. Although six paylines are shown, typically many more original paylines are used in a game. For example, a preferred game uses fifty original paylines. Referring to FIG. 1B, in addition to the original paylines, the diagram shows several additional paylines 7, depicted as solid lines, which also define combinations of symbol locations that are used to determine winning outcomes. Again in this view, far fewer paylines are shown than are used in a typical embodiment so as not to complicate the image. The preferred embodiment includes awards that add 150, 250, 350, and even 950 additional paylines that are evaluated along with the original 50 paylines for total lines of 200, 300, 400, and 1000 respectively. As depicted in FIG. 1A, special symbol 3 preferably has a label reflecting the total number of paylines after the additional paylines are awarded, with "300 Lines" indicating that 250 additional lines are evaluated plus the 50 original paylines.

Figure 3A:
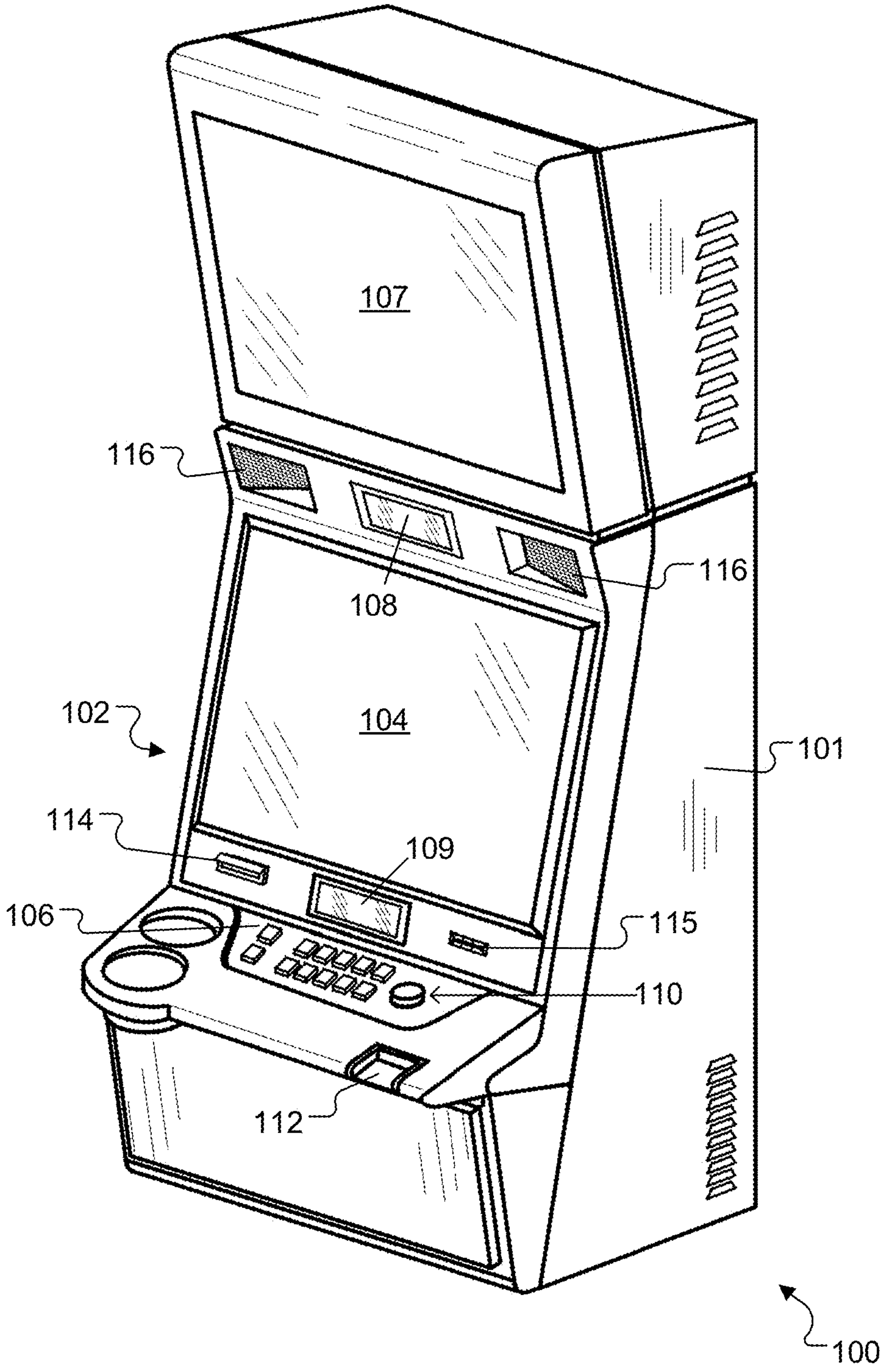
FIG. 3A is a front perspective view of a gaming machine which may be used in a gaming system embodying the principles of the present invention.

The diagram of FIG. 1B in particular shows details of one example embodiment of a payline meter zone 1506. The zone 1506 is animated to add excitement to the award phase of game outcomes that win additional paylines. As further described below, the award presentation preferably includes an extended payline cycling phase in which the payline meter lights up and flashes successive levels of the meter while applying an additional 50 or 100 of the total additional paylines. That is, the additional paylines are evaluated a portion at a time, to extend the excitement of the award phase. While a tiered meter is shown, any suitable meter animation may be used, or a mechanical meter configuration may be used in some versions. Further, while the payline meter zone 1506 is shown to be on the same game screen as the matrix 1501, other versions may place the meter on another display in the gaming machine's cabinet such as displays 107 or 109 (FIG. 3A).

Along the bottom of the game screen diagrams are found various game information readouts and interaction buttons, such as the current wager display 1510, available credits display 1512, the current payout display 1514, and the bet per line display 1515. The touchscreen play button 1516 may be used instead of the manual button shown on the example gaming cabinet in FIG. 3A. The Help/Pays button 1511 accesses the help screen and paytable information for the game. Along the bottom of the matrix 1501, there is a message line 1518 for showing current messages to the player from the game or gaming network. Between the message line 1518 and the lower display items is an instruction area 1513 which is updated to display various instructions or feature explanations regarding the game.

Figure 1C:
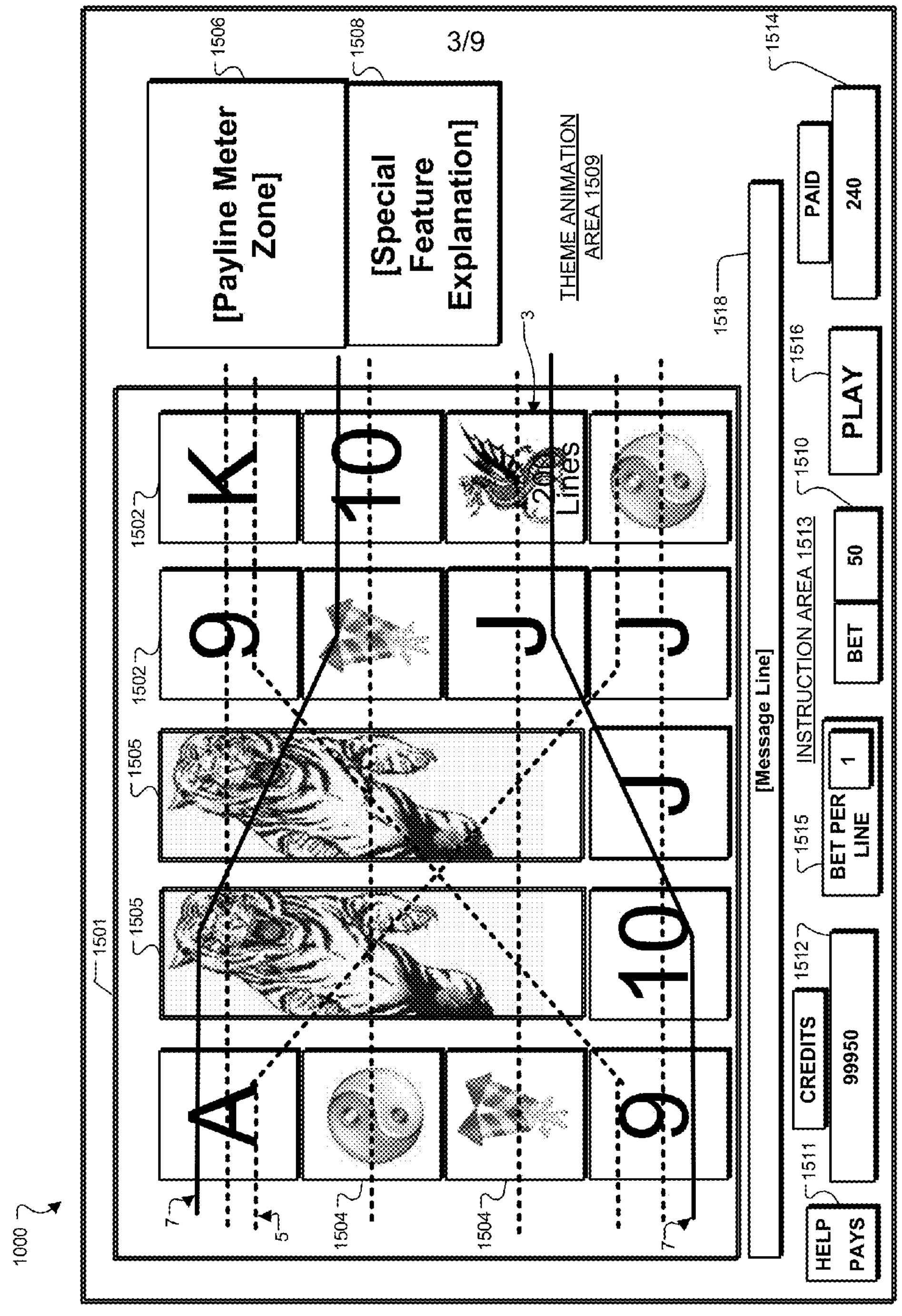
FIG. 1C is another example game screen diagram showing a result with stacked wild symbols benefitting from the additional paylines.

FIG. 1C is another example game screen diagram showing a result with stacked wild symbols. In the depicted example game result, the fifth reel 1502 has a special symbol 3 present, which is labeled "200 Lines" and therefore awards 150 additional paylines to be evaluated for the current game result. Further, the second and third reels each contain a stacked wild symbol 1505, which fills three stacked symbol locations and makes them wild symbols within the game rules. The stacked wild symbols 1505 may be used to advantage together with special symbols 3 to enhance the excitement of the game by giving a visual indicator that the player can look for and anticipate which results in large award values. The features work together to provide higher prize awards as follows. The stacked wild symbols 1505 each provide that three symbol locations are turned wild. In the game rules according to a preferred embodiment, a minimum of three matching symbols in a row along a payline produces a win for that payline. Therefore, when two stacked wild symbols appear side-by-side as shown or separated by one reel only, they guarantee wins for the lines that pass through both symbols and the spots between or beside them. For example, the depicted original payline 5 (the only one labeled 5 in this figure for simplicity), has a win because it passes through the 'A' symbol and both stacked wild symbols, producing a win of three matched A's. Several other original paylines as depicted and others that are not depicted for clarity will also have similar wins. The additional 150 paylines, which are added to the evaluated lines because of the "200 Lines" special dragon symbol 3 being spun up, will have many lines that have similar winning patterns. For example, the additional payline 7 shown beginning at the top left 'A' symbol will have winning pattern of three A's. Of course, some additional paylines will not benefit from the special confluence of symbols shown. For example, the lower depicted additional payline 7, shown beginning at the '9' symbol on the lower left, will not benefit from the stacked wilds because it does not pass through one or two of them. However, a large number of the 150 additional paylines that are applied in this depicted game result would have a winning pattern because of the stacked wild symbols 1505. The total amount won as a result of the two stacked wild symbols 1505 appearing together with a special symbol will therefore be increased to approximately the ratio of additional lines to original lines. For example, in the depicted screen 150 additional lines are awarded to supplement the original 50 lines, making the prize approximately 4× larger than the original prize that would have been achieved because approximately 4× as many paylines have winning patterns.

Figure 2A:
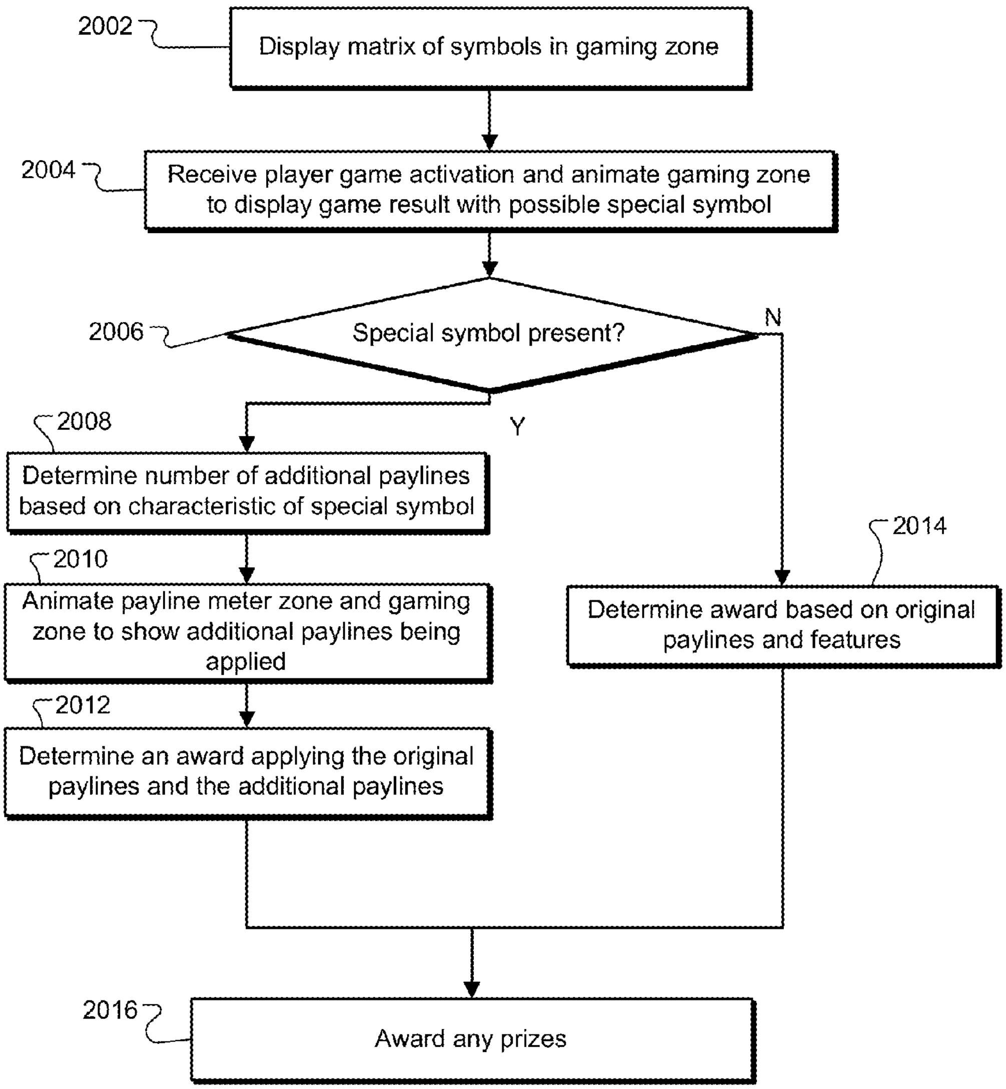
FIG. 2A is a flowchart showing an example of the game play process at a gaming machine that includes the additional payline award feature according to an example embodiment.

FIG. 2A is a flowchart showing an example of the game play process at a gaming machine that includes the payline award special symbol and the payline meter zone feature according to an example embodiment. This flowchart includes the payline meter zone functionality for the preferred embodiment shown in the above Figures, which may not be included in all embodiments. The process starts in step 2002 where the game displays an arrangement of symbols in the gaming zone. This display is achieved by controlling a touch sensitive gaming display with one or more electronic processors under the control of suitable program code, such as is done with the preferred gaming machine embodiment shown in FIG. 3A. The gaming display including a gaming zone includes a matrix of symbol locations which will be updated to provide results of the game. The gaming display shown at this step further includes a second payline meter zone outside of the gaming zone, which at this step may be displayed as greyed out or inactive, because no additional payline awards have yet been achieved. Alternatively, the payline meter may be active and show the amount of original paylines which, in the preferred examples herein, is 50 paylines, meaning the first meter bar would be lit in the example payline meter zone 1506 shown in FIG. 1B.

Next, at step 2004, the process receives a player game activation and, in response, produces an animated display in the gaming zone showing motion in the symbol locations indicating a game is conducted. In the preferred game this animation shows the simulated reels 1502 spinning. Other known games including randomizing of game elements, or other non-random animations may also be used. The game display at this step occurs over a period of time such that the player may perceive that the animated reels are spinning and may include a slowing-down step where the player may root for certain symbols, such as the large stacked wild symbols or the special symbols, to stop on the display. The preferred process at this step also obtains the randomized game outcome, preferably from a gaming server as described below. Receiving this outcome provides no perceptible delay to the process, and the outcome is therefore available when it is needed for decisions in the process steps below.

Next, at step 2006, the process determines if a special symbol 3 is present in the result at a designated location. One version allows the symbol to be active only in the fifth reel. In preferred versions this step does not require actually checking symbol locations in memory because the result is known and reversed-mapped to the symbols presented. Other versions may of course use a true-spin which checks the symbols to see if a special symbol is there. In either case, the process will go to step 2014 if no special symbol 3 is present, and evaluate the matrix of locations for payline wins based on only the original paylines. If the special symbol 3 is present, it is evaluated to determine the number of additional paylines to be awarded at step 2008. For special symbols that include a number indicator in the symbol graphics, these are directly correlated to a number of special symbols, because the number indicator shows the total paylines (original plus additional) or in some versions the number of additional paylines to be awarded. Other versions may use other conditions to determine the number of additional paylines to be awarded at step 2008. For example, accumulated persistent multipliers may be used to multiply the original symbol amount or a designated additional symbol amount. A random determination may also be used to choose a number of additional symbols to provide.

Using the number of additional symbols, the process next animates the payline meter zone 1506 to display the number of additional paylines being added to the original paylines at step 2010. This step preferably includes animation in the payline meter zone 1506 correlated with payline cycling animation in the matrix 1501 to communicate to the player that the additional paylines are being evaluated for winning patterns.

Figure 2B:
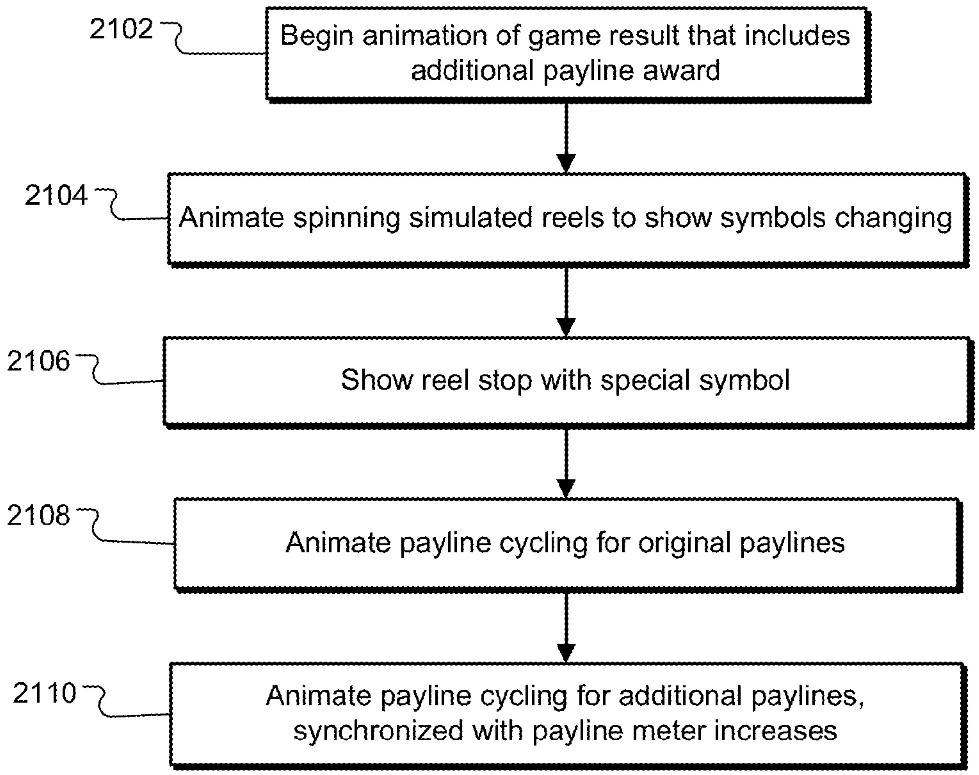
FIG. 2B is a flowchart showing an example game play process of presenting an award with the additional paylines.

Referring to FIG. 2B, an example of the animation of step 2010 is described in further detail for one preferred embodiment. The animation preferably involves animating the meter along with payline cycling. Payline cycling is known in the art and involves cycling through each evaluated payline by flashing a line or highlight in the symbol matrix along the payline and graphically emphasizing any winning patterns found thereon. As shown in FIG. 2B, the animation begins at step 2102 and the first shows animation of the game result that is randomizing or scrambling the symbols in a manner such as reel spinning at step 2104. As discussed above, the special symbol is shown on this result at step 2106. Next at step 2108, the process animates the original paylines to show winning patterns being recognized and credited to the player. The cycling may be provided in groups related to meter levels in the payline meter zone 1506. For example, based on the meter zone embodiment in FIG. 1B, the meter 1506 would first animate the "50 Lines" by flashing or lighting it, while the symbol matrix 1501 displays cycling animations identifying winning patterns in the original paylines. Next, at step 2110, the meter zone would animate the "100 Lines" bar, while the matrix 1501 evaluates a selected group of 50 more paylines out of the additional 250 paylines awarded in the example result in FIG. 1B. This process continues in step 2110 and repeatedly evaluates groups of additional paylines until the meter reached the 300 line bar and all the additional paylines are evaluated. This is only one example and other techniques may be used to animate a meter zone and display animations showing the additional paylines being evaluated.

Referring back to FIG. 2A, after the animation and payline cycling which communicates the winning patterns achieved on the additional paylines, the process has determined the total award based on applying both the original paylines and additional paylines as indicated at step 2012, and awards this total prize to the player at step 2016.

Figure 3B:
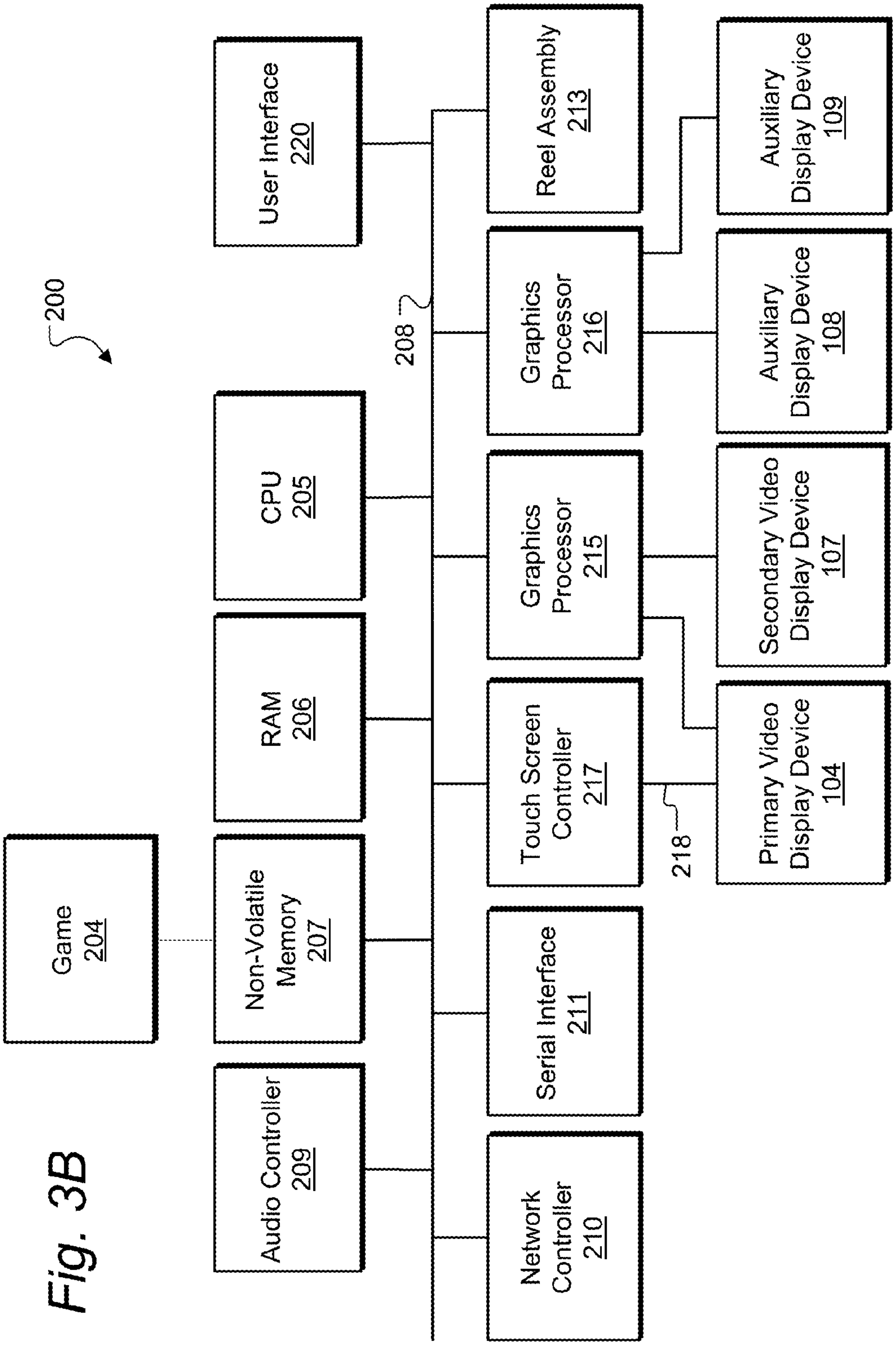
FIG. 3B is a block diagram showing various electronic components of the gaming machine shown in FIG. 3A together with additional gaming system components.

FIG. 3A shows a gaming machine 100 that may be used to implement a payline meter zone game according to the present invention. The block diagram of FIG. 3B shows further details of gaming machine 100. Referring to FIG. 3A, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 3A also includes a number of mechanical control buttons 110 mounted on ledge 106. These control buttons 110 may allow a player to select a bet level, select paylines, select a type of game or game feature, and actually start a play in a primary game. Further, primary video display device 104 in gaming machine 100 provides a convenient display device for implementing touchscreen controls.

It will be appreciated that gaming machines may also include a number of other player interface devices in addition to devices that are considered player controls for use in playing a particular game. The ledge may also include a hardware special object including a button, touch sensor, or switches, joysticks, or other mechanical input devices, and/or virtual buttons and other controls implemented on a suitable touchscreen video display. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 3B shows a logical and hardware block diagram 200 of gaming machine 100 which includes a central processing unit (CPU) 205 along with random access memory 206 and nonvolatile memory or storage device 207. All of these devices are connected on a system bus 208 with an audio controller 209, a network controller 210, and a serial interface 211. A graphics processor 215 is also connected on bus 208 and is connected to drive primary video display device 104 and secondary video display device 107 (both mounted on cabinet 101 as shown in FIG. 3A). A second graphics processor 216 is also connected on bus 208 in this example to drive the auxiliary display devices 108 and 109 also shown in FIG. 3A. As shown in FIG. 3B, gaming machine 100 also includes a touch screen controller 217 connected to system bus 208. Touch screen controller 217 is also connected via signal path 218 to receive signals from a touchscreen element associated with primary video display device 104. It will be appreciated that the touchscreen element itself typically comprises a thin film that is secured over the display surface of primary video display device 104. The touchscreen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 3B are elements commonly associated with a personal computer. These elements are preferably mounted on a standard personal computer chassis and housed in a standard personal computer housing which is itself mounted in cabinet 101 shown in FIG. 3A. Alternatively, the various electronic components may be mounted on one or more circuit boards housed within cabinet 101 without a separate enclosure such as those found in personal computers. Those familiar with data processing systems and the various data processing elements shown in FIG. 3B will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 3B as being connected directly on system bus 208 may in fact communicate with the other system components through a suitable expansion bus. Audio controller 209, for example, may be connected to the system via a PCI bus. System bus 208 is shown in FIG. 3B merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. In some embodiments, the payline meter zone may be displayed on secondary video display 107 rather than beside the matrix of symbol locations or other type of primary gaming zone on the primary display. The invention is not limited to any particular arrangement of processing devices for controlling the video display device included with gaming machine 100. Also, a gaming machine implementing the present invention is not limited to any particular number of video display devices or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine, and may also implement a game client for directing one or more display devices at the gaming machine to display portions of a payline meter zone game according to the present invention. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs, while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 100 is included. In particular, network controller 210 provides an interface to a game controller which controls certain aspects of the special symbol game as will be discussed below in connection with FIG. 4A.

It should be noted that the invention is not limited to gaming machines employing the personal computer-type arrangement of processing devices and interfaces shown in example gaming machine 100. Other gaming machines through which a special symbol game is implemented may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. It is possible to implement an additional payline award game within the scope of the present invention using an electro mechanical arrangement or even a purely mechanical arrangement for displaying the symbols or first and second animations or reactions needed to complete the additional payline award game as described herein. However, the most preferred forms of the invention utilize one or more video display devices for displaying the spinning reels and the selectable modifier elements. For example, a gaming machine suitable for providing an additional payline award game may include a mechanical reel-type display rather than a video-type display device for displaying results in a primary game, and include a video display device for presenting the payline meter zone or object separately.

Still referring to the hardware and logical block diagram 200 showing an example design for a gaming machine 100, the depicted machine in operation is controlled generally by CPU 205 which stores operating programs and data in memory 207 with wagering game 204, user interface 220, network controller 210, audio/visual controllers, and reel assembly 213 (if mechanical reel configuration). CPU or game processor 205 may comprise a conventional microprocessor, such as an Intel Pentium microprocessor, mounted on a printed circuit board with supporting ports, drivers, memory, software, and firmware to communicate with and control gaming machine operations, such as through the execution of coding stored in memory 207 including one or more wagering games 204. Game processor 205 connects to user interface 220 such that a player may enter input information, and game processor 205 may respond according to its programming, such as to apply a wager and initiate execution of a game.

Figure 4A:
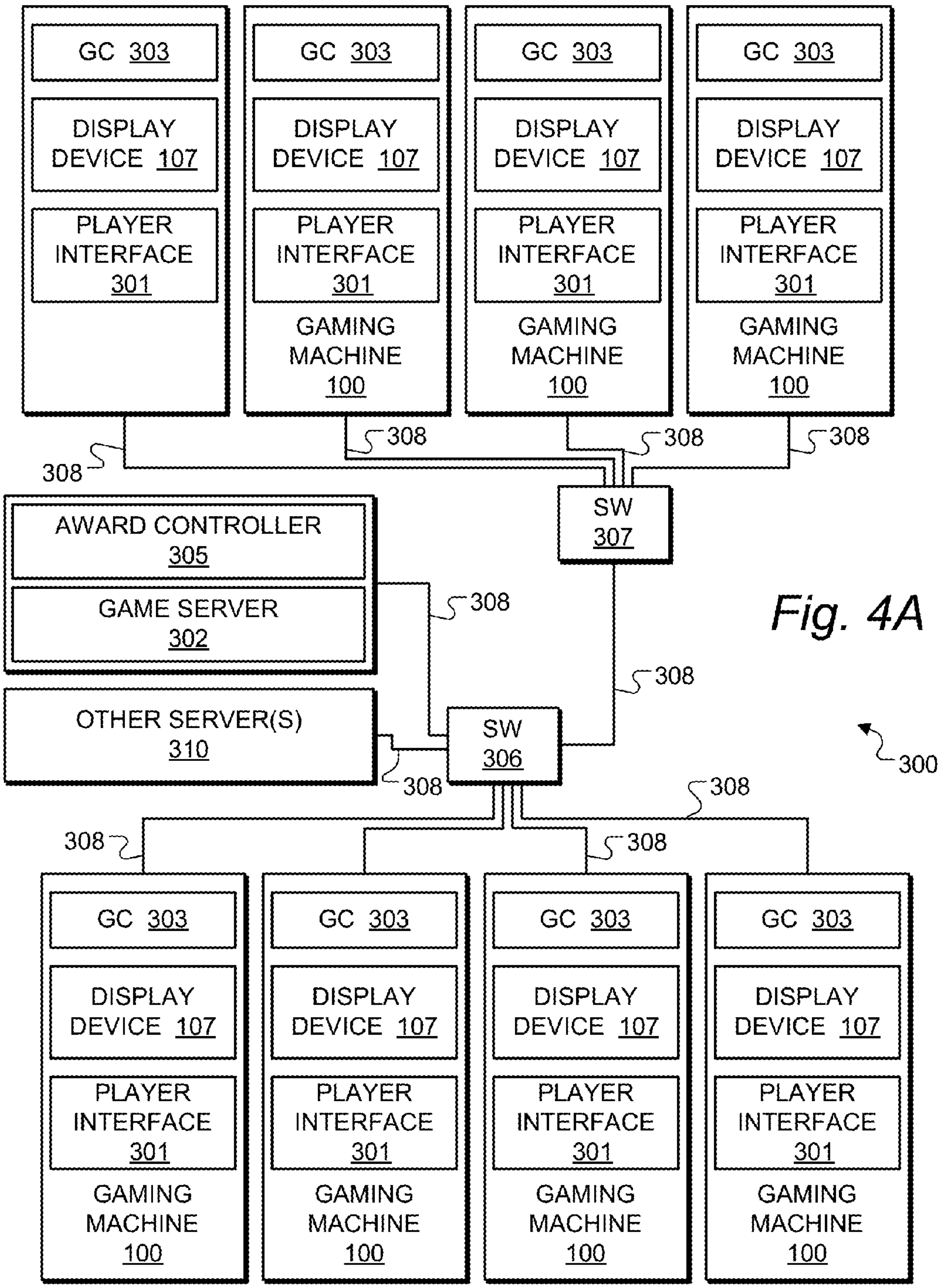
FIG. 4A is a system block diagram of a gaming system according to one embodiment of the present invention.
Figure 4B:
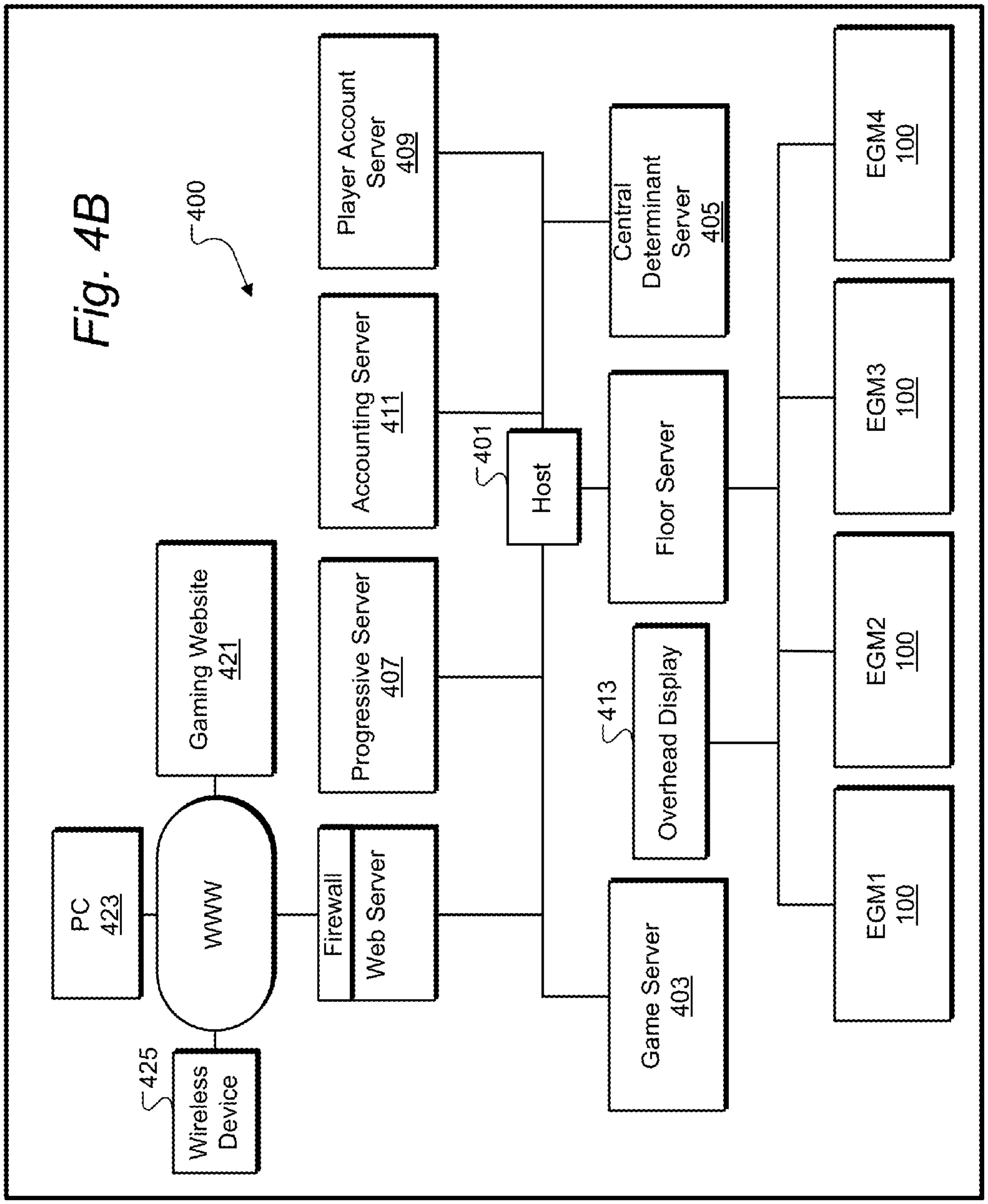
FIG. 4B is a system block diagram of a gaming system according to another embodiment.

Game processor 205 also may connect through network controller 210 to a gaming network, such as example casino server network 400 shown in FIG. 4B. Referring now to FIG. 4B, the casino server network 400 may be implemented over one or more site locations and include host server 401, remote game play server 403 (which may be configured to provide game processor functionality including determining game outcomes and providing audio/visual instructions to a remote gaming device), central determinant server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards.

Referring now to FIG. 4A, a gaming system 300 according to another embodiment of the present invention is shown again in a network and system diagram format. System 300 includes a number of gaming machines, each comprising a gaming machine 100 in this example implementation. For purposes of describing system 300, each gaming machine 100 in FIG. 4A is shown as including a video display device 107 and a player interface 301 that may include buttons, switches, or other physical controls and/or touchscreen controls as discussed above in connection with FIG. 4A. System 300 further includes a game server 302 and a respective game client 303 (abbreviated "GC" in FIG. 4A) included with each respective gaming machine 100. In the form of the invention shown in FIG. 4A, these two components, game server 302 and the game client components 303, combine to implement a game control arrangement which will be described in detail below. System 300 also includes an award controller 305, which is shown in FIG. 4A as being associated with game server 302 to indicate that the two components may be implemented through a common data processing device/computer system. Gaming machines 100, game server 302, and award controller 305 are connected in a network communication arrangement including first and second network switches 306 and 307, connected together through various wired or wireless signal paths, all shown as communications links 308 in FIG. 4A.

Each gaming machine 100, and particularly player interface 301 associated with each gaming machine, allows a player to make any inputs that may be required to make the respective gaming machine eligible for an additional payline award game, and make selections of any selectable objects displayed at the respective gaming machine in the course of the additional payline award game. Player interface 301 also allows a player at the gaming machine to initiate plays in a primary game available through the gaming machine in some implementations. The respective video display device 107 associated with each respective gaming machine 100 is used according to the invention to generate the graphic displays to show the various elements of an additional payline award game at the respective gaming machine.

The game control arrangement made up of game server 302 and the respective game client 303 at a given gaming machine functions to control the respective video display device 107 for that gaming machine to display a number of selectable modifier objects. Award controller 305 is responsible for awarding prizes for a player's participation in an additional payline award game, and maintaining progressive prize information where the additional payline award game offers one or more progressive prizes. The network arrangement made up of network switches 306 and 307, and the various communication links 308 shown in FIG. 4A is illustrated merely as an example of a suitable communications arrangement. It should be noted that the game control arrangement, or as it is referred to generally the "game controller," may be implemented in some embodiments entirely on the gaming machine. This is especially true in jurisdictions that allow Class III gaming conducted with random number generators at each gaming machine. The present invention is not limited to any particular communications arrangement for facilitating communications between game server 302 and various gaming machines 100. Any wired or wireless communication arrangement employing any suitable communications protocols (such as TCP/IP for example) may be used in an apparatus according to the invention.

FIG. 4A shows other server(s) 310 included in the network. This illustrated "other server(s)" element 310 may include one or more data processing devices for performing various functions related to games conducted through system 300 and any other games that may be available to players through gaming machines 100. For example, apparatus 300 may be accounting servers providing support for cashless gaming or various forms of mixed cash/cashless gaming through the various gaming machines 100. In this example, an additional one of the other servers 310 will be included in apparatus 300 for supporting these types of wagering and payout systems. As another example, the various gaming machines 100 included in system 300 may allow players to participate in a game (primary game) other than the additional payline award game described herein, and this other game may rely on a result identified at or in cooperation with a device that is remote from the gaming machines. In this example, another server 310 may be included in the system for identifying results for the primary game and communicating those results to the various gaming machines 100 as necessary. Generally, the other server(s) 310 shown in FIG. 4A are shown only to indicate that numerous other components may be included along with the elements that participate in providing additional payline award games according to the present invention. Other server(s) 310 may provide record keeping, player tracking, accounting, result identifying services, or any other services that may be useful or necessary in a gaming system.

Referring to FIG. 4B, a block diagram of another example networked gaming system 400 associated with one or more gaming facilities is shown, including one or more networked gaming machines 100 in accordance with one or more embodiments. With reference to FIG. 4B, while a few servers have been shown separately, they may be combined or split into additional servers having additional capabilities.

As shown, networked gaming machines 100 (EGM1-EGM4) and one or more overhead displays 413 may be network connected and enable the content of one or more displays of gaming machines 100 to be mirrored or replayed on an overhead display. For example, the primary display content may be stored by the display controller or game processor 205 and transmitted through network controller 210 to the overhead display controller either substantially simultaneously or at a subsequent time according to either periodic programming executed by game processor 205 or a triggering event, such as a jackpot or large win, at a respective gaming machine 100. In the event that gaming machines 100 have cameras installed, the respective player's video images may be displayed on overhead display 413 along with the content of the player's display 104 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Blackberry cell phone, Apple iPhone, personal data assistant (PDA), iPad, etc.). To enter the website, a player may log in with a username (that may be associated with the player's account information stored on player account server 409 or be accessible by a casino operator to obtain player data and provide promotional offers), play various games on the website, make various personalizing selections and save the information, so that during a next gaming session at a casino establishment, the player's playing data and personalized information may be associated with the player's account and accessible at the player's selected gaming machine 100.

Referring generally to the description herein, any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some subcombination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for providing additional paylines in a wagering game conducted through a gaming machine, the method including:

(a) controlling a gaming display device of the gaming machine with one or more electronic processors associated with the gaming machine, the gaming display device displaying a gaming zone comprising a matrix of symbol locations through which multiple original paylines are defined, each original payline defining a respective position for one of a number of possible winning patterns of symbols;

(b) receiving a player game activation through a player interface of the gaming machine and, in response, beginning an animated display in the gaming zone under control of the one or more electronic processors, the animated display showing motion in the symbol locations indicating a game is in progress;

(c) stopping the animated display in the gaming zone under control of the one or more electronic processors to show a game result in the symbol locations, the game result including a number of symbols arranged in the symbol locations, and possibly including a special symbol;

(d) if the special symbol is included in the game result in one or more designated locations, (i) providing multiple additional paylines defined in the matrix of symbol locations, each additional payline defining a respective position for one of the possible winning patterns of symbols, and wherein at least one of the additional paylines does not intersect the symbol location of the special symbol, and the number of additional paylines is based on a characteristic of the special symbol; and (ii) under control of the one or more electronic processors, determining an award for the game based on the original paylines and the additional paylines being applied to the game result; and (e) paying the award determined for the game.

2. The method of claim 1, wherein the special symbol comprises one of a number of special symbols, each respective special symbol causing a different designated quantity of additional paylines to be provided and evaluated.

3. The method of claim 2, wherein each special symbol includes a visual indication of the number of additional paylines with which that special symbol is associated.

4. The method of claim 1, further comprising displaying a meter indicator in a second display zone separate from the gaming zone, the meter indicator providing a graphical representation of the total paylines employed including the original paylines and the additional paylines.

5. The method of claim 1, further comprising presenting the award for the game in an animation having a first phase depicting the original paylines being applied and a second phase depicting the additional paylines being applied.

6. The method of claim 5, further comprising displaying a meter indicator in a second display zone separate from the gaming zone, the meter indicator providing a graphical representation of the total paylines employed including the original paylines and the additional paylines, the meter indicator being animated simultaneously with the second phase of the animation to depict the additional paylines being applied.

7. A program product comprising program code stored on one or more tangible, non-transitory computer readable media, the program code executable by at least one processor associated with a gaming machine for:

(a) controlling a gaming display device of the gaming machine, the gaming display device displaying a gaming zone comprising a matrix of symbol locations through which multiple original paylines are defined, each original payline defining a respective position for one of a number of possible winning patterns of symbols;

(b) receiving a player game activation from a player interface of the gaming machine and, in response, beginning an animated display in the gaming zone showing motion in the symbol locations indicating a game is in progress;

(c) stopping the animated display in the gaming zone to show a game result in the symbol locations, the game result including a number of symbols arranged in the symbol locations, and possibly including a special symbol;

(d) if the special symbol is included in the game result in one or more designated locations, (i) providing multiple additional paylines defined in the matrix of symbol locations, each additional payline defining a respective position for one of the possible winning patterns of symbols, and wherein at least one of the additional paylines does not intersect the symbol location of the special symbol, and the number of additional paylines is based on a characteristic of the special symbol; and (ii) determining an award for the game based on the original multiple paylines and the additional paylines being applied to the game result; and (e) paying the award determined for the game.

8. The program product of claim 7, wherein the special symbol comprises one of a number of special symbols, each respective special symbol causing a different designated quantity of additional paylines to be provided and evaluated.

9. The program product of claim 8, wherein each special symbol includes a visual indication of the number of additional paylines with which that special symbol is associated.

10. The program product of claim 7, further comprising displaying a meter indicator in a second display zone separate from the gaming zone, the meter indicator providing a graphical representation of the total paylines employed including the original paylines and the additional paylines.

11. The program product of claim 7, further comprising presenting the award for the game in an animation having a first phase depicting the original paylines being applied and a second phase depicting the additional paylines being applied.

12. The program product of claim 11, further comprising displaying a meter indicator in a second display zone separate from the gaming zone, the meter indicator providing a graphical representation of the total paylines employed including the original paylines and the additional paylines, the meter indicator being animated simultaneously with the second phase of the animation to depict the additional paylines being applied.

* * * * *